United States Patent
Subrahmanya

(10) Patent No.: US 7,454,209 B2
(45) Date of Patent: Nov. 18, 2008

(54) ADAPTING OPERATION OF A COMMUNICATION FILTER BASED ON MOBILE UNIT VELOCITY

(75) Inventor: Parvathanathan Subrahmanya, Sunnyvale, CA (US)

(73) Assignee: Qualcomm Incorporated

(*) Notice: Subject to any disclaimer, the term of this patent is extended or adjusted under 35 U.S.C. 154(b) by 386 days.

(21) Appl. No.: 10/632,411

(22) Filed: Aug. 1, 2003

(65) Prior Publication Data

US 2004/0125771 A1 Jul. 1, 2004

Related U.S. Application Data

(60) Provisional application No. 60/408,807, filed on Sep. 5, 2002.

(51) Int. Cl.
  *H04Q 7/20* (2006.01)
  *H04B 1/00* (2006.01)
  *H04B 1/10* (2006.01)
(52) U.S. Cl. .................. 455/441; 370/290; 375/143
(58) Field of Classification Search ............ 455/441, 455/456.1, 456, 522, 69, 130, 136, 504–506, 455/432.1, 442; 375/219, 229, 232, 14, 230, 375/148, 267, 350, 143, 147, 154; 342/457; 370/344, 320, 290, 500, 491
  See application file for complete search history.

(56) References Cited

U.S. PATENT DOCUMENTS

| | | | | | |
|---|---|---|---|---|---|
| 5,267,266 | A | * | 11/1993 | Chen | 375/232 |
| 6,067,324 | A | * | 5/2000 | Harrison | 375/267 |
| 6,151,358 | A | * | 11/2000 | Lee et al. | 375/232 |
| 6,163,534 | A | * | 12/2000 | Wang | 370/347 |
| 6,236,365 | B1 | * | 5/2001 | LeBlanc et al. | 342/457 |
| 6,249,682 | B1 | * | 6/2001 | Kubo et al. | 455/522 |
| 6,272,168 | B1 | * | 8/2001 | Lomp et al. | 375/222 |
| 6,301,291 | B1 | * | 10/2001 | Rouphael et al. | 375/150 |
| 6,351,642 | B1 | * | 2/2002 | Corbett et al. | 455/442 |
| 6,373,882 | B1 | * | 4/2002 | Atarius et al. | 375/148 |
| 6,388,613 | B1 | | 5/2002 | Nagatsuma et al. | 342/357.08 |
| 6,507,602 | B1 | * | 1/2003 | Dent | 375/142 |
| 6,529,850 | B2 | * | 3/2003 | Wilborn et al. | 702/142 |
| 6,658,050 | B1 | * | 12/2003 | Ramesh et al. | 375/219 |

(Continued)

FOREIGN PATENT DOCUMENTS

WO 0048332 8/2000

(Continued)

OTHER PUBLICATIONS

Hyun Jun Oh "An adaptive channel estimatimation scheme for DS-CDMA system" IEEE 2000, XP-001033051, p. 2839-2843.*

(Continued)

*Primary Examiner*—Joseph Feild
*Assistant Examiner*—Kiet Doan
(74) *Attorney, Agent, or Firm*—Thomas Rouse; Charles Brown; Kenneth K. Vu

(57) ABSTRACT

A method and apparatus are provided for adapting a pilot filter based on the velocity of a wireless communication device (WCD) in relation to a wireless network infrastructure. The pilot filter is adapted by determining pilot coefficients for the pilot filter based on the WCD velocity. The pilot filter may be located in the WCD, or in the network infrastructure, or in both.

38 Claims, 6 Drawing Sheets

U.S. PATENT DOCUMENTS

| | | | |
|---|---|---|---|
| 6,668,172 B1 * | 12/2003 | Yoshimura | 455/441 |
| 6,813,309 B1 * | 11/2004 | Ogino | 375/148 |
| 6,907,026 B2 * | 6/2005 | Akiyama | 370/344 |
| 2001/0000219 A1 * | 4/2001 | Agazzi et al. | 375/230 |
| 2001/0004384 A1 * | 6/2001 | Takanashi et al. | 375/229 |
| 2002/0042279 A1 * | 4/2002 | Da Rocha et al. | 455/456 |

FOREIGN PATENT DOCUMENTS

| | | |
|---|---|---|
| WO | 0048332 A1 | 8/2000 |
| WO | 03015364 | 2/2003 |
| WO | 03015364 A1 | 2/2003 |

OTHER PUBLICATIONS

Li et al: "An Adaptive Filtering Technique For Pilot Aided Transmission Systems", 1999 IEEE, XP 000204166, pp. 507-512.

Oh et al: "An Adaptive Channel Estimation Scheme For DS-CDMA Systems", IEEE 2000, XP 001033051, pp. 2839-2843.

Oh, et al., "An Adaptive Channel Estimation Scheme for DS-CDMA Systems", IEEE Vehicular Technology Conference, Sep. 2000, pp. 2839-2843.

Li, et al., "An Adaptive Filtering Technique for Pilot Aided Transmission Systems", Vehicular Technology Conference, May 1990, pp. 507-512.

* cited by examiner

ADAPTING OPERATION OF A COMMUNICATION FILTER BASED ON MOBILE UNIT VELOCITY

RELATED APPLICATIONS

This application claims priority to U.S. Provisional Ser. No. 60/408,807, filed on Sep. 5, 2002.

BACKGROUND OF THE INVENTION

1. Field of the Invention

The invention relates generally to wireless communication. In particular, the invention relates to adaptive filters for use in wireless communication systems.

2. Description of Related Art

Wireless communication systems are widely deployed and these systems support the transmission of various types of traffic data, for example, voice, packet data, and other types of data. Communication over a wireless channel can be accomplished using a variety of techniques which facilitate a large number of users in a limited frequency spectrum. These techniques, commonly referred to as multiple access techniques, include time division multiple access (TDMA), frequency division multiple access (FDMA), and code division multiple access (CDMA).

CDMA offers many advantages over other multiple access techniques used in wireless communication systems such as TDMA and FDMA. For example, CDMA permits the frequency spectrum to be reused multiple times, thereby permitting an increase in system user capacity. Additionally, use of CDMA techniques permits the special problems of the wireless channel to be overcome, for example, by mitigation of the adverse effects of multipath, e.g. fading, while also exploiting the advantages thereof.

In wireless communication systems, a pilot signal is sometimes transmitted from a transmitter unit to a receiver unit and can be used to assist the receiver unit to perform a number of functions. For example, the pilot signal can be used at the receiver unit for synchronization with the timing and frequency of signals transmitted by the transmitter unit, estimation of the quality of the wireless communication channel, coherent demodulation of a data transmission, determination of which specific transmitter unit having the best communication link to the receiver unit, estimation of the highest data rate supportable the wireless channel, and other uses.

Generally, a pilot signal is generated based on a known data pattern and using a known signal processing scheme. For example, in a communication system based on CDMA, a pilot signal is typically a sequence of all zeroes, and the sequence is "covered", or modulated, with a particular channelization code and "spread", or modulated, with a known scrambling code or pseudo-noise (PN) sequence.

The wireless communication channel presents challenges to the communication system. One challenge of communication over a wireless channel is commonly referred to as "multipath." In a wireless communication channel, a transmitted signal may travel multiple different paths, or multipaths, as the signal propagates between a transmitter and a receiver. These multipath signals may be caused, for example, by reflection off of obstacles, such as buildings, bridges, people, and other obstacles as the signal travels from the transmitter to the receiver. These reflected, or multipath, signals are received as multiple instances of the transmitted signal, delayed in time and phase from each other. Because these multipath signals are no longer in phase when they recombine at the receiver, they can result in a lower signal level commonly referred to as a "fade." In addition, multipath signals change over time as the receiver, the obstacles, or both, move about, causing the paths traveled by the multipath instances of the transmitted signal to change.

A technique used to improve operation of the communication system in a multipath environment is a rake receiver. A rake receiver includes multiple processing "fingers" and each received multipath signal instance of sufficient strength may be assigned to, and processed by, a respective finger processor. Each finger of the rake receiver processes the assigned multipath signal instance, in a manner complementary to that performed at the transmitter unit, to recover a pilot signal and traffic data from the signal received over a multipath communication channel.

The amplitude and phase of the recovered pilot signal will be distorted by, and indicative of, the multipath characteristics of the communication channel, or the channel response. Because the pilot signal and traffic data signal travel through the same communication channel they will, typically, be similarly distorted by the channel response. Knowledge of the amplitude and phase of the pilot signal can be used to align fingers in a rake receiver that are assigned to multipath instances of traffic data signals such that the multiple instances of the transmitted signal may be combined to derive demodulated symbols having improved quality. In addition, knowledge of the amplitude and phase of the pilot signal can be used to reassign fingers as the multipath wireless channel changes over time.

The quality of the recovered pilot signal can impact the performance of the demodulation process, which may in turn impact the overall performance of the communication system. Recovery of the pilot signal typically involves using a pilot filter because a pilot signal is typically degraded by channel noise. In addition, the pilot signal is typically further distorted by fading in the communication channel. Due to these and other reasons, it is challenging to estimate the time-varying response of signals transmitted through the communication channel based upon the received pilot signal. That is, the channel response refers to the variety of changes a signal undergoes from the time it is transmitted until it is received.

Therefore, there is a need in the art for techniques to provide an improved estimate of the time-varying response of a communication channel from a received pilot signal in a wireless communication system. The present invention satisfies this need.

SUMMARY OF THE INVENTION

The present invention provides a method and apparatus for adjusting a pilot filter in a wireless communication system according to a velocity of a wireless communication device (WCD) in relation to a wireless network infrastructure, such as a base station. Aspects of the invention include determining the velocity of the WCD and determining adjustments to be made to a pilot filter of the system based on the velocity. The pilot filter to be adjusted can be located at various locations in the communication system. For example, the pilot filter in a WCD can be adjusted, or the pilot filter at various nodes of the wireless network infrastructure (infrastructure) can be adjusted. Determining the velocity of the WCD, and determining adjustments to the pilot filter of a receiver, can be performed at various locations within the infrastructure, in the WCD, or in any combination thereof.

For example, in one embodiment, the WCD determines its velocity, and determines pilot filter adjustments based on the velocity. In a second embodiment, the infrastructure determines the velocity of the WCD, and determines pilot filter adjustments based on the velocity of the WCD. In a third embodiment, the WCD determines its velocity and transmits it to the infrastructure. The infrastructure then determines pilot filter adjustments based on the velocity of the WCD. In a fourth embodiment, the infrastructure determines the velocity of the WCD and transmits it to the WCD. The WCD then determines pilot filter adjustments based on the velocity.

The adjustments can be used to adjust a pilot filter in either the WCD or the wireless network infrastructure. For example, if the desired pilot filter adjustments are determined in the WCD, then the WCD can use the adjustments to adjust its pilot filter, or the adjustments can be transmitted to the infrastructure and a pilot filter in the infrastructure is adjusted. Similarly, if the adjustments to be made to a pilot filter are determined in a device of the infrastructure, then the infrastructure device can use the adjustments to adjust its pilot filter, or the adjustments can be transmitted to the WCD and the pilot filter in the WCD is adjusted.

Adjustments to the pilot filter can include, for example, adjusting filter coefficients, and thus the pilot filter bandwidth, to provide an improved estimate of the response of the communication channel through which a pilot signal is received.

Other features and advantages of the present invention should be apparent from the following description of the preferred embodiment which illustrates, by way of example, principles of the invention.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

In accordance with the invention a technique is described that adjusts a pilot filter to account for changes in the characteristics of the communication channel. For example, the pilot filter can be adjusted to account for changes in fading of a received signal based on the velocity, or speed, of a wireless communication device (WCD).

Adjusting a pilot filter in an "adaptive" manner, such as changing the filter's bandwidth in response to changes in the communication channel, can provide an improvement in an estimate of the received signal characteristics due to the time varying response of the communication channel. Typically, a pilot signal received, for example by a WCD or a base station, may experience different channel conditions at different times, and different instances of a transmitted signal (multi-paths), may experience different channel conditions even when received close in time. By adapting the pilot filter to account for the different channel conditions, a better estimate of the channel response can be made and thereby provide an improvement in the overall operation of the communication receiver, for example, by improving the assignment of fingers in a rake receiver.

Figure 1:
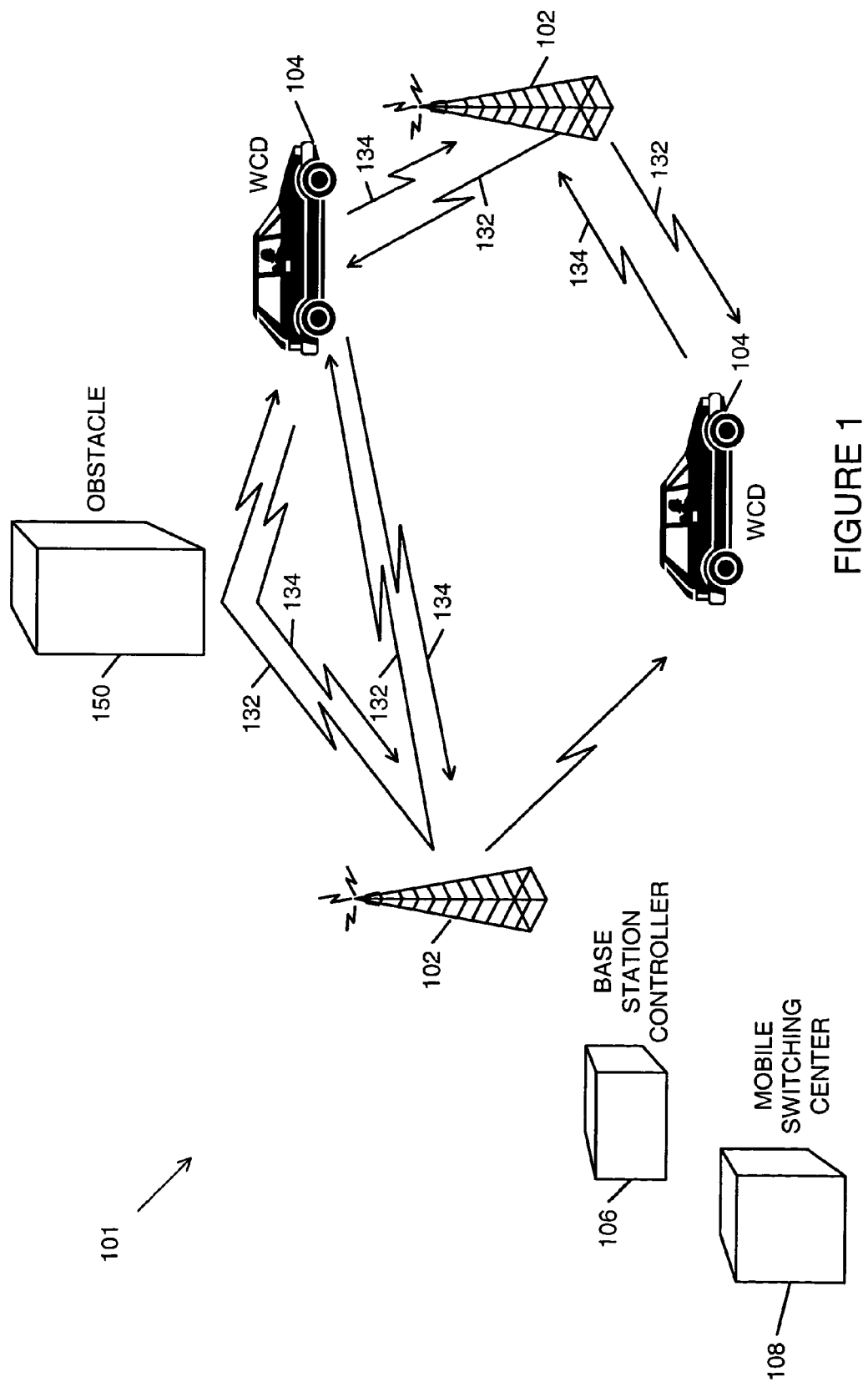
FIG. 1 is a block diagram illustrating portions of an embodiment of a wireless communication system.

FIG. 1 is a block diagram illustrating portions of a wireless communication system 101 that operates in accordance with the present invention. The wireless communication system includes a wireless network infrastructure with multiple base stations 102, and multiple WCDs 104 that communicate with the base stations. The wireless network infrastructure also includes other components, such as base station controllers 106, mobile switching centers 108, and the like. Signals 132 transmitted from a base station 102 to a WCD are referred to as the forward link. Signals 134 transmitted from a WCD to a base station are referred to as the reverse link. As illustrated in FIG. 1, both the forward link and the reverse link can travel different, multiple paths between a base station 102 and a WCD. As shown in FIG. 1, forward and reverse link signals may be reflected off an obstacle 150 resulting in multiple instances of the signal being received. This condition is commonly referred to as experiencing "multipath" signals. As discussed further below, to accommodate operation in a multipath environment, both base stations and WCDs in a CDMA system use a "Rake" receiver that processes signals using Rake "fingers" wherein each finger of the rake is assigned to an individual received signal instance. Fingers of the rake receiver may be assigned to different instances of the same transmitted signal or to different signals received from different base stations.

Examples of WCDs 104 include cellular telephones, satellite telephones, wireless communication enable personal computers and personal digital assistants (PDA), and other wireless devices. The wireless communication system 101 can be designed to support one or more CDMA standards. For example, the standards may include TIA/EIA-95-B (IS-95), TIA/EIA-98-C (IS-98), $3^{rd}$ Generation Partnership Project (3GPP); $3^{rd}$ Generation Partnership Project 2 (3GPP2), cdma2000, Wideband CDMA (WCDMA), and others.

A transmitted pilot signal is generally degraded by noise in the communication channel and further distorted by fading due to movement by the WCD or obstacles within the communication channel. A pilot filter with a narrow bandwidth, as opposed to a wider bandwidth, is generally more effective at removing more of the channel noise, but is less effective at tracking variations in the received pilot signal due to fading. Conversely, a pilot filter with a wide bandwidth is generally more effective at tracking signal variations due to fading, but also allows a higher amount of channel noise to propagate through the pilot filter.

It is desired to provide a pilot filter whose response can be adapted based on the channel conditions. The channel conditions can be quantified by various characteristics, such as, the signal-to-total-noise-plus-interference ratio (SNR) of the received pilot, estimates of the channel noise power level, the velocity of the WCD, as well as other channel characteristics. The coefficients of the pilot filter may thus be adapted as a function of these and other channel characteristics. Typical pilot filter configurations include finite impulse response (FIR) and infinite impulse response (IIR) filters.

In one aspect of the system 101, a pilot filter time constant, which defines the filter bandwidth, is adapted by estimating the channel noise power level and WCD velocity. Using these estimates, a set of coefficients are determined. The coefficients can be selected from a set of predetermined values stored, for example, in a lookup table, or determined when the estimates are made. The coefficients are applied to the filter to adapt the response of the filter to the channel conditions. In another aspect, the filter coefficients can be determined based on the WCD velocity without regard to the noise power level.

Figure 2:
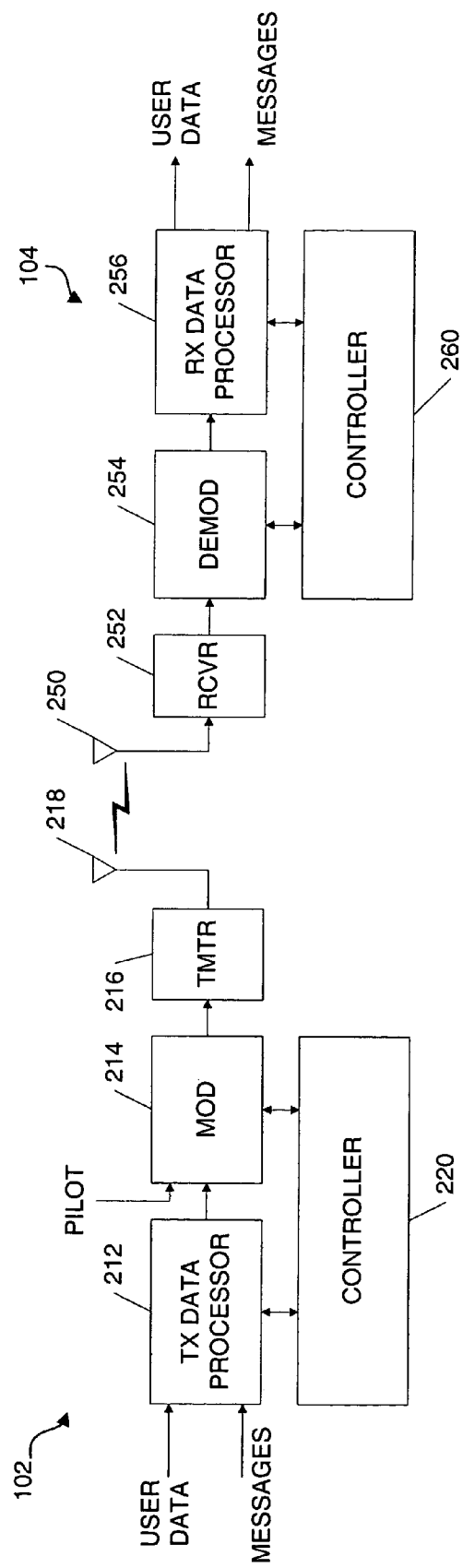
FIG. 2 is a simplified block diagram illustrating further detail of the embodiment of the wireless communication system.

FIG. 2 is a simplified block diagram illustrating further detail of the embodiment of the wireless communication system illustrated in FIG. 1. FIG. 2 shows the base station 102 and WCD 104 in the wireless communication system 101. On the forward link, meaning transmissions from the base station 102 to the WCD 104, a transmit data processor 212 in the base station 102 receives a pilot signal along with various types of "traffic signals" such as user-specific data, voice, messages, and so on. The transmit data processor 212 formats and codes the pilot signal and the traffic signals based on one or more coding schemes. Typically, the pilot signal and different types of traffic signals are coded using different coding schemes.

A modulator 214 in the base station 102 receives coded pilot and traffic signals from the transmit data processor 212, and further processes the received data to generate modulated data. For some CDMA systems, processing by the modulator 214 includes: (1) covering the coded pilot and traffic signals with different channelization codes and thereby channelizing the pilot and traffic signals onto their respective channels; and (2) spreading the channelized pilot and traffic signals. In IS-95 and cdma2000 the channelization codes are Walsh codes, and in W-CDMA the channelization codes are orthogonal variable spreading factor (OVSF). Scrambling codes are complex pseudo-noise (PN) sequences used to spread the transmitted signal across a wider bandwidth. In IS-95 and cdma2000 the scrambling codes used by a particular base station are at a fixed phase offset from scrambling codes used by other base stations so that a receiver can distinguish one base station form another. In W-CDMA a different unique, scrambling code is used by each base station. "Covering" with a Walsh code in IS-95 and cdma2000 is equivalent to "spreading" with an OVSF code in W-CDMA, and "spreading" with the PN sequence in IS-95 and cdma2000 is equivalent to "scrambling" with a scrambling sequence in W-CDMA.

The output of the modulator 214 is provided to a transmitter 216 and conditioned to generate a forward modulated signal suitable for transmission, via an antenna 218, over a wireless communication channel to the WCD 104. Typically in a communication system based on CDMA, the transmitter 216 converts the modulated data to one or more analog signals, amplifies, filters, and quadrature modulates the signal to be transmitted.

At the WCD 104, the forward modulated signal is received by an antenna 250 and provided to a receiver 252. The receiver 252 conditions the received signal and provides data samples. Typically, the receiver 252 filters, amplifies, downconverts, and digitizes the received signal into data samples. The output of the receiver 252 is connected to a demodulator 254 that processes the data samples to provide recovered symbols. For some CDMA systems, processing by the demodulator 254 includes: (1) despreading the data samples with the same scrambling code used to spread the data at the base station; (2) decovering the despread samples to channelize the received pilot and traffic signals onto their respective channels; and (3) coherently demodulating the channelized data with the pilot signal recovered from the received signal. The demodulator 254 may implement a rake receiver that can process multiple signal instances in the received signal, as described below.

A receive data processor 256 receives and decodes the symbols from the demodulator 254 to recover the user-specific data and messages transmitted on the forward link. The processing by the demodulator 254 and the receive data processor 256 is complementary to that performed by the modulator 214 and the transmit data processor 212, respectively, at the base station 102.

As noted, in some wireless communication systems a pilot signal is transmitted along with other types of traffic data signals on the forward link from the base station 102 to the WCD 104. In addition, some wireless communication systems also transmit a pilot signal on the reverse link from each active WCD 104 to the base station 102. The transmitted pilot signals can be used by a receiver to coherently demodulate the various traffic data signals transmitted along with the pilot signal.

In general, to generate the pilot signal at the base station 102, pilot data is initially covered with a particular channelization code used to transmit the pilot, and further spread with the scrambling code. To simplify the signal processing at both the base station 102 and the WCD 104, CDMA systems typically use a sequence of all zeroes for the pilot data and a channelization code of zero for the pilot channel. In this case, the pilot is effectively the scrambling code assigned to the base station.

W-CDMA supports a number of different pilot channels. First, a common pilot channel (CPICH) can be generated as described above and transmitted on a primary base station antenna. A diversity CPICH can also be generated as described above, except that the pilot data is non-zero, that is not a sequence of all zeroes, and transmitted on a diversity antenna of the base station 102. Furthermore, one or more secondary CPICHs can be transmitted in a restricted part of the coverage area of the base station 102, and each secondary CPICH is generated using a non-zero channelization code. The base station 102 can further transmit a dedicated pilot to a specific user using the same channelization code as the user's data channel. In this case, the pilot symbols are time-multiplexed with the data symbols to that user.

The WCD 104 can also transmit a pilot signal on the reverse link, along with its traffic data signals, to the base station 102. The techniques described are applicable for processing pilot signals on the forward link, reverse link, as well as different types of pilot channels as described above, and other pilot channels that might also be transmitted in a wireless communication system.

At the WCD 104, the pilot signal from the base station 102 can be recovered by processing a received signal in a manner complementary to that performed at the base station 102. The processing at the WCD can include: (1) conditioning and digitizing the received signal to provide data samples; (2) despreading the data samples with the scrambling code at a specific chip offset, or phase, matching that of the multipath instance being processed; (3) decovering the despread samples with the same channelization code used to cover the pilot signal at the base station; and (4) multiplying the decovered samples with the known pilot signal data and accumulating the resulting samples over an appropriate period of time.

In the example where the pilot data is a sequence of all zeroes and the channelization code is zero, then the processing to recover the pilot signal includes despreading the data samples with the scrambling code and accumulating the despread samples over an integer multiple of the length of the channelization code. This complementary signal processing recovers the pilot signal transmitted from the base station and removes other transmissions on other traffic data channels from this and other base stations.

Figure 3:
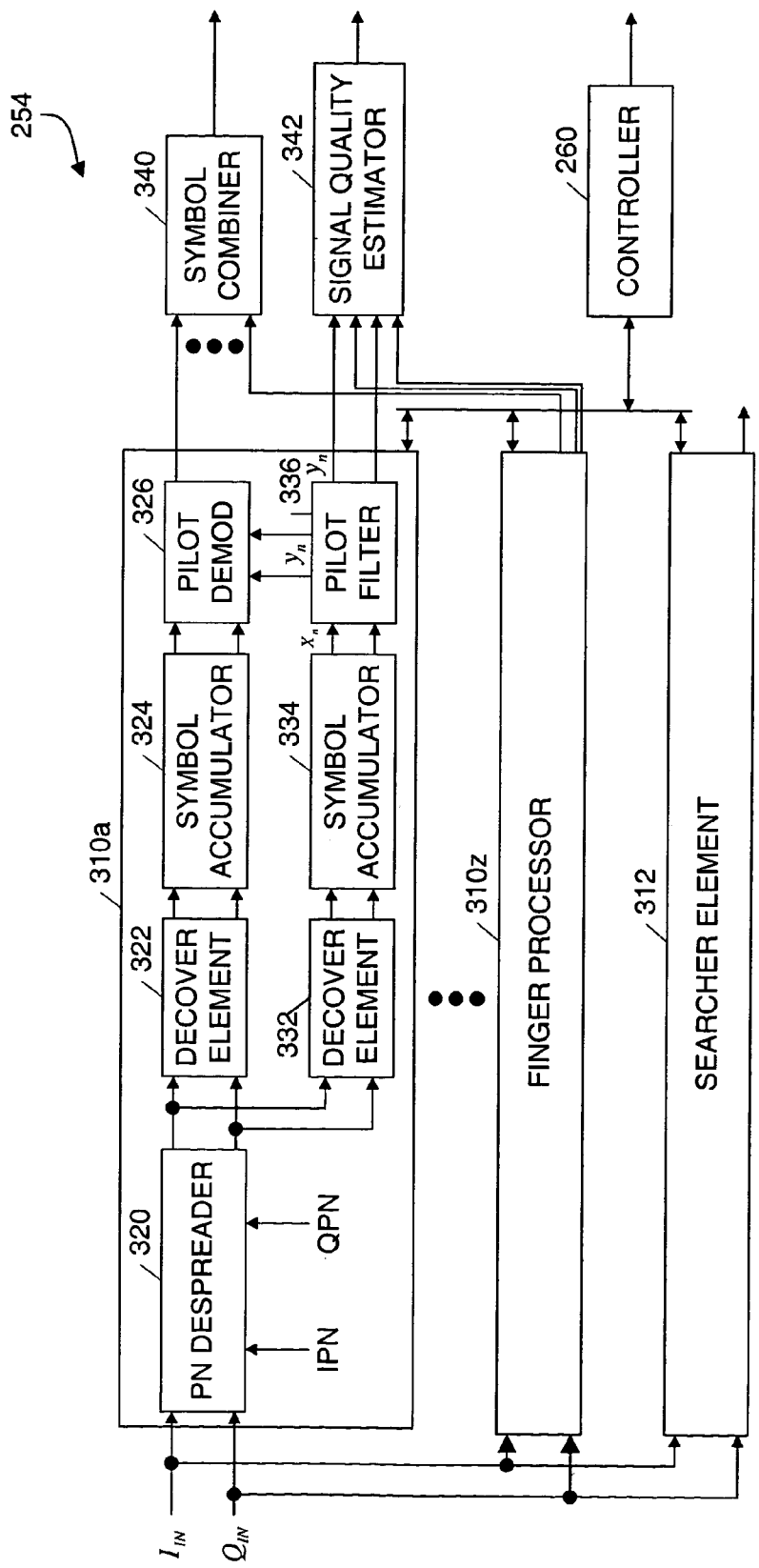
FIG. 3 is a block diagram of one embodiment of a demodulator.

FIG. 3 is a block diagram of one embodiment of a demodulator 254 that can be used to search for strong signal instances, or multipaths, in a received signal and to demodulate one or more multipaths of sufficient strength. This embodiment of the demodulator 254 implements a rake receiver that includes a number of finger processors 310, or demodulation fingers, and a searcher 312, or searcher element.

Due to multipath and other phenomena, a signal transmitted from a base station 102 to a WCD 104 may travel multiple, different, paths. The received signal at the WCD can thus include a number of multipaths instances for signals transmitted by one or more base stations. Typically, the searcher 312 is used to search for strong multipaths in the received signal and to provide an indication of the strength and timing of each multipath found that meets a set of criteria.

The rake receiver can process multiple signal instances found by the searcher 312 by assigning one finger processor 310 to process each multipath instance of interest. Typically, a finger processor 310 is assigned, as determined by controller 260, to a multipath instance based on signal strength information of the particular multipath instance as provided by the searcher 312.

As shown in FIG. 3, the in-phase and quadrature complex samples, $I_{IN}$ and $Q_{IN}$ respectively, from the receiver 252 are provided to a number of finger processors 310a through 310z. Within each finger processor 310 assigned to process a particular multipath instance, the $I_{IN}$ and $Q_{IN}$ samples are provided to a PN despreader 320, which also receives the same scrambling code tat was used to spread the data at the base station. The scrambling code provided to the PN despreader 320 is generated in accordance with the particular CDMA standard being implemented and with a particular chip offset, or phase, of the base station to which the chip offset of the multipath instance being processed by that finger processor 310 will be aligned.

The PN despreader 320 can perform a complex number-multiply of the complex $I_{IN}$ and $Q_{IN}$ samples with the scrambling code and can provide complex despread $I_{DES}$ and $Q_{DES}$ samples to decover elements 322 and 332. The first decover element 322 decovers the despread samples with one or more channelization codes (e.g., Walsh codes or OVSF codes) used to cover the data, and generates complex decovered data samples. The decovered data samples are then provided to a symbol accumulator 324, that accumulates the samples over the length of the channelization code to generate decovered data symbols. The decover element 322 and symbol accumulator 324 effectively form a first "channelizer" that recovers the data transmitted on a particular traffic channel. The decovered data symbols are then provided to a pilot demodulator 326.

For many CDMA systems the forward link includes a pilot signal that is transmitted continuously, at all times, or non-continuously, during portions of a transmission. To recover the transmitted pilot signal the second decover element 332 decovers the despread samples with the particular channelization code used to cover the pilot at the base station 102. The channelization code is Walsh code zero for IS-95 and cdma2000, and an OVSF code of zero for some pilot channels in W-CDMA. The decovered pilot samples are then provided to an accumulator 334, which accumulates sets of samples to provide pilot symbols, $x_n$. Each set includes a number of samples for $N_C$ chips, which represents a pilot accumulation time interval. The accumulation time interval can be, for example, an integer multiple of the length of the channelization code used for the pilot signal, an entire pilot reference period if the pilot signal is transmitted in bursts, or some other time interval. The symbol accumulator 334 then provides the pilot symbols to a pilot filter 336. The decover element 332 and symbol accumulator 334 effectively form a second channelizer that recovers the pilot signal transmitted on a particular pilot channel.

The pilot filter 336 may be implemented with various filter designs, as described below. In general, the pilot filter 336 filters the received pilot symbols, $x_n$, to provide pilot signal estimates, $y_n$, which are estimates of the response of the communication channel through which the multipath instance traveled. The pilot filter 336 may also receive and utilize the decovered data symbols from the symbol accumulator 324 to provide improved pilot estimates. Typically, the pilot filter 336 provides one pilot estimate for each decovered data symbol to be coherently demodulated. The pilot estimates are provided to a pilot demodulator 326 and are used to coherently demodulate the decovered traffic data symbols, and are also provided to a signal quality estimator 342 that detects the strength of the recovered pilot.

The pilot demodulator 326 may perform coherent demodulation of the decovered traffic data symbols from the symbol accumulator 324 with the pilot estimates from the pilot filter 336 and provides demodulated symbols to a symbol combiner 340. Coherent demodulation can be achieved by performing a dot product and a cross product of the decovered data symbols with the pilot estimates. The dot and cross products effectively perform a phase demodulation of the data and also scale the resultant output by the relative strength of the recovered pilot. By scaling with the relative strength of the received pilots, each of the finger processors 310 effectively weigh the contributions from different multipath instances in accordance with the quality of the multipath instances for efficient combining. Thus, the dot and cross products perform the dual roles of phase projection and signal weighting that are characteristics of a coherent rake receiver.

The symbol combiner 340 receives and coherently combines the demodulated symbols from all assigned finger processors 310 to provide recovered symbols for a particular data transmission being processed by the rake receiver. The recovered symbols are then provided to the subsequent processing element, for example, the receive data processor 256 (FIG. 2).

The signal quality estimator 342 can compute the energy of the pilot by: (1) squaring the in-phase and quadrature components of the pilot estimates, $P_I^2$ and $P_Q^2$, where $y_n = P_I + jP_Q$; (2) summing each pair of squared results to generate a sum of squares, $P_I^2 + P_Q^2$; or (3) accumulating $N_M$ sums of squares to generate a correlated value that is indicative of the strength of the recovered pilot.

Conventionally, a single pilot filter with a specific response is used in each finger processor to filter the pilot symbols to provide the pilot estimates. This pilot filter has a particular bandwidth selected to be robust across all channel conditions, and is a bandwidth that is typically selected to provide acceptable performance based on certain assumptions for the channel conditions. However, because the channel conditions can vary over time for a given WCD and typically vary from WCD to WCD, using pilot filters of identical specification for all WCDs at all times provides sub-optimal performance in many situations. An aspect of a device constructed in accordance with the invention is to provide techniques to improve the performance of the pilot filter by making the filter "adaptive" so as to operate differently depending on channel conditions and to provide an improved estimate of the response of the communication channel based on the velocity of the mobile WCD.

As noted, a transmitted pilot signal can be degraded by noise in the communication channel and can further be distorted by fading due to movement of the WCD. A filter with a narrow bandwidth, or a long time constant, is more effective at removing the channel noise, but is less effective at tracking variations in the received pilot due to fading. Conversely, a filter with a wide bandwidth, or a short time constant, is more effective at tracking signal variations due to fading, but is less effective at removing channel noise and thereby allows a higher amount of channel noise to pass through the filter.

Table 1 lists a general relation of filter responses that are likely to provide improved performance for various channel conditions. The two data rows in Table 1 correspond to different WCD velocities, low and high, and the two data columns correspond to different amounts of channel noise, low and high. When the WCD velocity is low a narrow bandwidth filter is generally preferred because the signal variations due to fading are typically small, and a narrow bandwidth filter will remove more of the channel noise while still being able to track the small signal variation. On the other hand, when the WCD velocity is high and the channel noise is low, the signal variations due to fading are typically large and a wide bandwidth filter is preferred even though a wide bandwidth filter is less effective in reducing the channel noise present in the signal. Finally, when the WCD velocity and the channel noise are both high, the filter response that can provide better performance is dependent on the amount of channel noise versus the amount of signal variations due to fading.

TABLE 1

|  | Low Channel Noise | High Channel Noise |
| --- | --- | --- |
| Low WCD Velocity | Narrow Bandwidth | Narrow Bandwidth |
| High WCD Velocity | Wide Bandwidth | Channel/Signal Ratio |

The symbols corresponding to a received pilot signal may be expressed as:

$$x_n = \beta_n + n_n,  \quad \text{Eq. (1)}$$

where the quantities $x_n$, $\beta_n$, and $n_n$ are complex values and:

$x_n$ represents the pilot symbols, as received at the WCD, $\beta_n$ represents the pilot symbols received at the WCD after experiencing fading due the channel but without any added noise, and $n_n$ represents the total noise, which includes the channel noise, receiver noise, and interference from other base stations and multipaths.

Because the transmitted pilot signal has a known and constant amplitude and phase, the pilot symbols received at the WCD, $x_n$, effectively represent the response of the communication channel.

It would be desirable to implement an "optimal" filter, thereby providing the upper bound on filter performance. In analyzing an optimal filter design it is assumed that fading is Rayleigh, short term and due to multipath factors, and that the noise is additive white Gaussian noise (AWGN). In addition it is assumed that the fading process and the AWGN are independent of each other. The received pilot signal represented by Equation (1) can be restated in terms of a vector equation as:

$$x = \beta + n \quad \text{Eq. (2)}$$

where x is a column vector having samples of the pilot symbol x(k), β is a column vector having successive fade coefficients in time β(k) where k specifies a particular signal sample, and n is zero mean AWGN. Under the assumptions, $\beta \approx CN(0, R_\beta)$, where $R_\beta$ is the fading auto-correlation matrix, and $n \approx CN(0, \sigma^2 I)$ with the noise samples being independent of each other. Using the well known linear observation model and solving for a Minimum Mean Square Error (MMSE) results in:

$$\beta_{opot} = R_\beta (R_\beta + \sigma^2 I)^{-1} x \quad \text{Eq. (3)}$$

Equation (3) illustrates that the best, or optimal, estimate of the channel fade, $\beta_{opt}$, at any time is a weighted linear combination of the past as well as the future observed x(k). In other words, an infinite non-causal FIR filter would result in an optimal estimate for the channel. The weights for the optimal filter depend on the channel auto-correlation, $R_\beta$, and the noise variance, $\sigma^2$. Again, under the assumptions and based on Clark's well known model, the normalized auto-correlation function of the channel can be given as:

$$R(\tau) = J_0(2\pi f_D \tau) \quad \text{Eq. (4)}$$

where $J_0$ is the Bessel function of the first kind of order 0, and $f_D$ is the Doppler frequency shift given by:

$$f_D = (v/c) f_c \quad \text{Eq. (5)}$$

where v is the velocity of the mobile WCD, c the speed of light, and $f_c$ is the carrier frequency. Thus, as illustrated, there is a direct correlation between the velocity of the mobile WCD and the filter estimate that is based on the filter coefficients. Typically, the pilot filter will be implemented as a finite impulse response (FIR) or an infinite impulse response (IIR) filter. While implementation of an infinite non-causal FIR filter may not be practical, many CDMA systems implement FIR filters with multiple taps.

Figure 4:
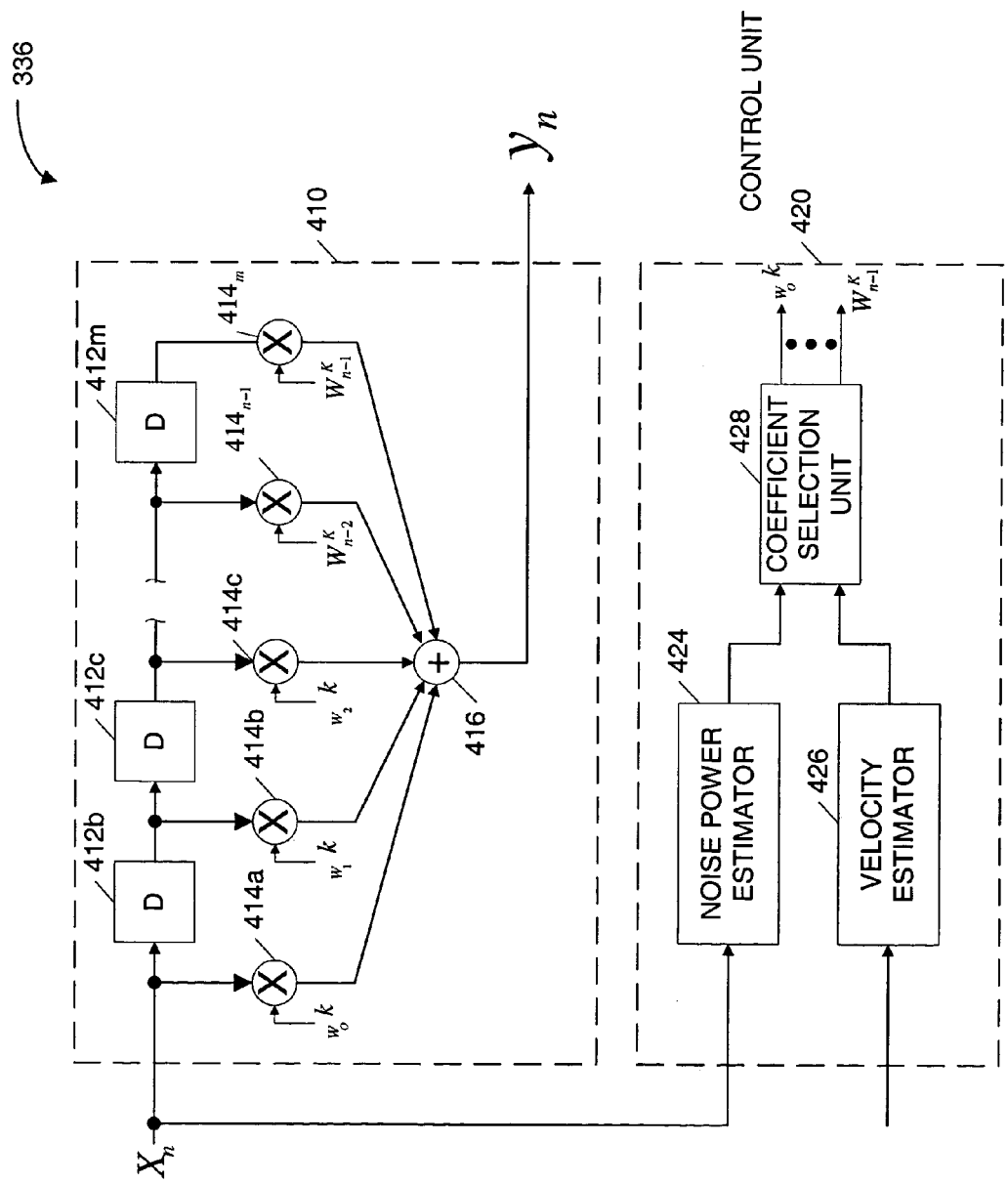
FIG. 4 is a block diagram of an embodiment of a pilot filter.

FIG. 4 is a block diagram of an embodiment of a pilot titter constructed in accordance with to invention. For example, the pilot filter illustrated in FIG. 4 can be used to implement the pilot filter 336 illustrated in FIG. 3, and includes a FIR filter 410 coupled to a control unit 420. The FIR filter 410 receives and filters the pilot symbols, $x_n$, in accordance with a particular filter response and provides the filtered pilot estimates, $y_n$. The particular response of the FIR filter 410, and thus the bandwidth, is determined by a set of coefficients, $w_0^k$ through $w_{N-1}^k$, provided by the control unit 420.

Within the FIR filter 410, the received pilot symbols, $x_n$, are provided to a set of series-coupled delay elements 412b through 412m. The received pilot symbols, $x_n$, and the outputs of the delay elements 412b through 412m are respectively provided to multipliers 414a through 414m, which also receive coefficients $w_0^k$ through $w_{N-1}^k$ respectively. Each of the multipliers receive the pilot symbol, or a delayed version of the pilot symbol, and multiplies the pilot symbol with the received coefficient and thereby provides a scaled symbol to a summer 416. The summer 416 adds the scaled symbols from all the multipliers to provide the filtered pilot estimate, $y_n$. The filtered pilot estimate from the FIR filter 410 may be expressed as:

$$y_n = \sum_{i=0}^{N-1} w_i^k \cdot x_{n-i}. \quad \text{Eq. (1)}$$

Within the control unit 420 a noise power estimator 424 receives and estimates the noise power in the received signal. The control unit 420 also includes a WCD velocity estimator 426. In one embodiment, the velocity estimator 426 receives a signal indicating the velocity of the mobile WCD, for example, from a global positioning system (GPS) receiver integrated with the mobile WCD. In another embodiment, the velocity estimator 426 receives signals indicating the location of the WCD at a known time, and by receiving the WCD locations at different times, the velocity estimator 426 determines an estimate of the velocity of the WCD.

The outputs of the noise power estimator 424 and the velocity estimator 426 are input to a coefficient selection unit

428. The coefficient selection unit 428 evaluates the estimate of the noise power and the estimate of the WCD velocity and determines a desired set of coefficients to be used by the filter 410. The coefficient selector unit 420 outputs the desired set of coefficients $w_0^k$ through $w_{N-1}^k$ to the filter 410 and the respective multipliers 414a through 414m.

Determination of the coefficients can be done in many different ways. For example, a set of values for coefficients may be predetermined and stored in a look up table and, depending on the noise power and velocity estimates, a particular set of coefficients are output to the filter. Another example of the determination of the coefficients would be to use the values of the noise power and velocity estimates to calculate a set of coefficients for use by the filter. In addition, the filter coefficients may be selected based on the estimate of the velocity of the WCD without reference to a noise power estimate.

In one embodiment, the coefficients are determined by the mobile WCD. In another embodiment, the estimate of the noise power and the estimate of the WCD's velocity are transferred from the WCD to another location in the wireless network infrastructure, where the filter coefficients are determined. In yet another embodiment, the estimate of noise power is transferred from the WCD to another location in the wireless network infrastructure, and the velocity of the WCD is determined at the network. For example, the velocity of the WCD can be determined at the network from measurements made upon signals received by the network that were transmitted from the WCD. In addition, the filter coefficients can be selected based on the estimate of the velocity of the WCD without reference to a noise power estimate.

The pilot filter coefficients can be used to adjust a pilot filter in the WCD or a pilot filter in the wireless network, or both. For example, the WCD can determine the pilot coefficients and adjust its own pilot filter or the WCD can transmit the pilot coefficients to the network where a pilot filter is adjusted, or both. In addition, the network can determine the pilot filter coefficients and adjust a pilot filter in the network, or transmit the coefficients to the WCD where a pilot filter is adjusted, or both. Pilot filter coefficients can also be different for the WCD and the network. For example, one set of coefficients can be determined for use in a WCD pilot filter and a different set of coefficients determined for use in a pilot filter in the network.

Figure 5:
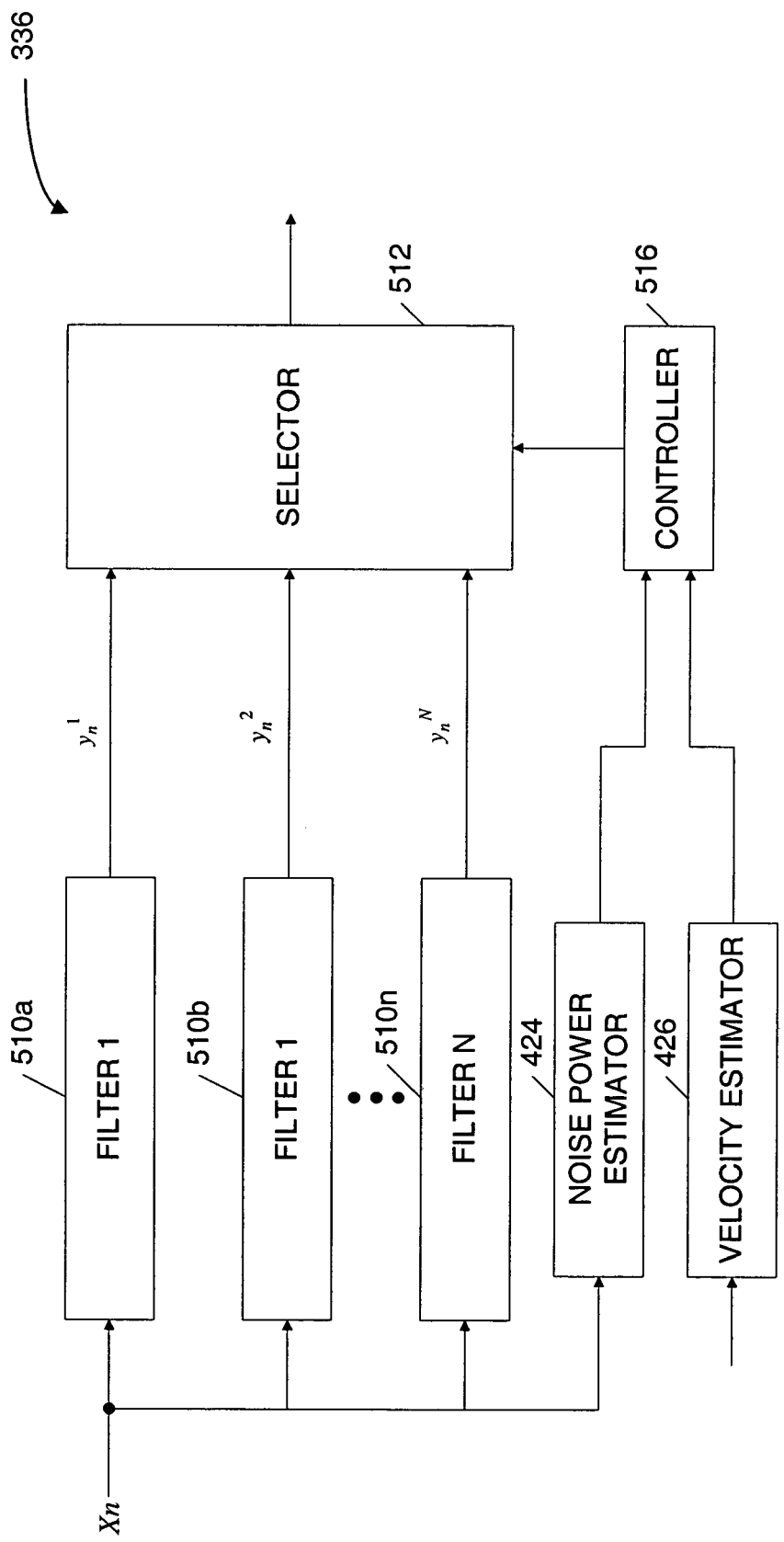
FIG. 5 is a block diagram of another embodiment of a pilot filter.

FIG. 5 is a block diagram of another embodiment of a pilot filter constructed in accordance with the invention. The pilot filter illustrated in FIG. 5 can be used to implement pilot filter 336 in FIG. 3. As illustrated in FIG. 5, the pilot filter 336 includes a bank of filters 510a through 510n. Each filter 510 may be implemented as a FIR or IIR filter, or some other filter structure. The filters 510a through 510n can be different types of filters, for example some of them can be FIR filters and others IIR while others are some other type of filter, and the different types of filters can be in any desired combination. In addition, each of the filters 510a through 510n can have a different response or bandwidth associated with it.

Each filter 510a through 510n receives and filters the pilot symbols $x_n$ and provides filtered pilot symbols $y_n^1$ through $y_n^N$ to a selector 512. The selector 512 then provides the filtered pilot symbols from the specific filter having the best, or desired, performance as selected by controller 516. The controller 516 receives estimates of the noise power from noise power estimator 424, and estimates of the WCD's velocity from velocity estimator 426. Based on the values of the noise estimate and velocity estimate the controller 516 will select the desired filter output. In another embodiment, the controller selects the desired filter coefficients based on the velocity estimate without reference to a noise power estimate.

Figure 6:
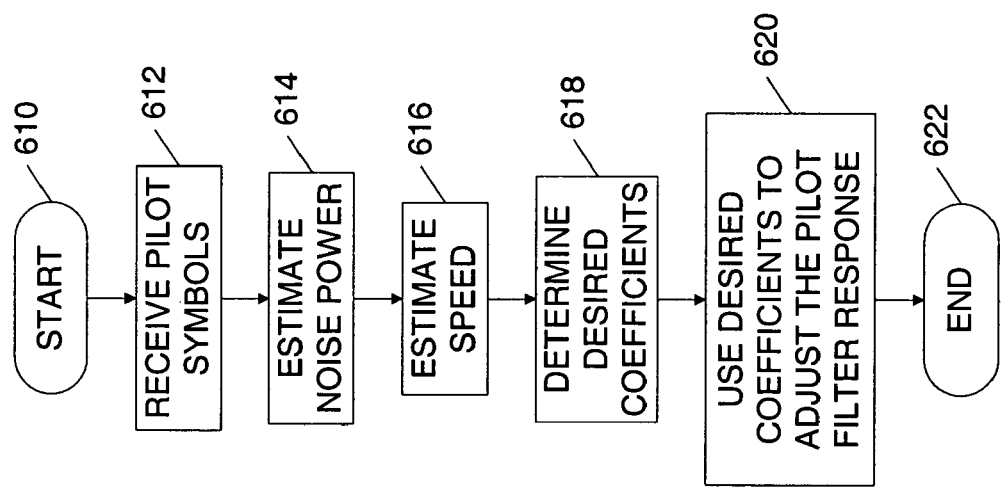
FIG. 6 is a flow diagram illustrating a technique of adapting a pilot filter.

FIG. 6 is a flow diagram illustrating a technique of adapting a pilot filter in accordance with the invention. Flow begins in block 610. In block 612 pilot symbols are received. Flow then continues to block 614 where an estimate of the noise power in the received signals is determined. Then, in block 616, an estimate of the velocity of the WCD is made. As discussed above, the estimate of the WCD's velocity may be provided by a device, such as a GPS receiver integrated with the WCD, or the WCD may determine its velocity, for example, by determining its location at various times and calculating its velocity, or the WCD velocity may be determined in the wireless network infrastructure.

Flow continues to block 618 where, using the estimate of the noise power and the estimate of the WCD's velocity, a set of filter coefficients is determined. In block 620 the set of desired coefficients are used to adjust the filter response. As discussed, in one embodiment, the coefficients are predetermined and stored, for example, in a look up table. In another embodiment, the coefficients are determined by the WCD in response to the estimates of the noise power and the mobile WCDs velocity. In yet another embodiment, the estimate of the noise power and the estimate of the WCD are transferred from the WCD to another location in the wireless network infrastructure where the filter coefficients are determined and are transferred back to the WCD. In still another embodiment, the estimate of noise power is transferred from the WCD to another location in the wireless network and the network receives, or calculates, the velocity of the WCD. For example, the velocity of the WCD can be determined from measurements made upon signal received by the network that were transmitted from the WCD. In addition, the filter coefficients can be selected based on the estimate of the velocity of the WCD without reference to a noise power estimate.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

I claim:

1. A method of adapting a pilot filter that processes received signals in a wireless communication network, the method comprising:
   determining a velocity of a wireless communication device in relation to a wireless network infrastructure;
   estimating a noise power estimate of at least one of the received signals; and
   determining one or more coefficients of the pilot filter based on the determined velocity of the wireless communication device and the noise power estimate,
   wherein:
   the pilot filter receives a plurality of pilot symbols; and
   each symbol of the plurality is multiplied by the at least one of the one or more coefficients.

2. A method as defined in claim 1, wherein determining the velocity of the wireless communication device and determining the one or more coefficients are performed in the wireless communication device.

3. A method as defined in claim 1, further comprising applying the one or more coefficients to a pilot filter.

4. A method as defined in claim 1, wherein determining the velocity further comprises receiving velocity information from a global positioning system receiver.

5. A method as defined in claim 1, wherein determining the velocity further comprises receiving at least two location measurements of the wireless communication device, wherein the measurements are made at different, known, times, and determining the velocity of the wireless communication device is based on the at least two location measurements and their respective measurement times.

6. A method as defined in claim 1, wherein determining the one or more coefficients further includes selecting the one or more coefficients from a set of predetermined coefficients.

7. A method as defined in claim 1, wherein the one or more coefficients vary with an increase in the determined velocity, and the one or more coefficients vary with a decrease in the determined velocity.

8. A method as defined in claim 1, wherein the coefficients are selected to adapt the pilot filter to a communication channel having an optimal performance.

9. A method as defined in claim 1, further comprising:
adapting the pilot filter to a communication channel having an optimal performance.

10. A communication device comprising:
a pilot filter that receives pilot signal samples over a communication channel; and
a controller that determines filter coefficients of the pilot filter based on the wireless communication device velocity and an estimate of noise power in the communication channel, and adapts the pilot filter to the communication channel,
wherein:
the pilot filter receives a plurality of pilot symbols; and
each symbol of the plurality is multiplied by the at least one of the one or more coefficients.

11. A communication deice as defined in claim 10, further comprising a set of predetermined coefficients.

12. A communication device as defined in claim 11, wherein the predetermined coefficients are retrieved from a look up table.

13. A communication device as defined in claim 10, wherein the velocity of the communication device is determined in accordance with information from a global positioning system receiver.

14. A communication device as defined in claim 10, wherein the velocity of the communication device is determined in accordance with at least two location measurements of the communication device, wherein the measurements are made at different, known times, and the velocity of the communication device is based on the at least two location measurements and their respective measurement times.

15. A communication device comprising:
a plurality of pilot filters each of which is configured to receive a pilot signal and to output a filtered pilot signal, wherein the plurality of filters are configured to be adapted by changing filter coefficients, and
a controller configured to select one of the plurality of pilot filter outputs based on the wireless communication device velocity and one of the plurality of pilot filters based on an estimate of noise power,
wherein the controller determines filter coefficients for the plurality of pilot filters based on the communication device velocity.

16. A communication device as defined in claim 15, wherein the filter coefficients are selected from a set of predetermined filter coefficients.

17. A communication device as defined in claim 16, wherein the predetermined coefficients are retrieved from a look up table.

18. A communication device as defined in claim 15, wherein the velocity of the communication device is determined based on information from a global positioning system receiver.

19. A wireless communication system comprising:
at least one mobile wireless communication device with a pilot filter that is configured to accept coefficients that adapt the operation of the filter to a communication channel response; and
an infrastructure device configured to communicate with the at least one mobile wireless communication device, wherein the infrastructure device receives signals from the mobile wireless communication device and based on those signals determines pilot filter coefficients and transmits the coefficients to the mobile wireless communication device for use in configuring the pilot filter,
wherein the signals received from the mobile wireless communication device include an estimate of a noise power level in the communication channel.

20. A wireless communication system as defined in claim 19, wherein the infrastructure includes a base station.

21. A wireless communication system as defined in claim 19, wherein the signals received from the mobile wireless communication device include an estimate of the mobile wireless communication device velocity.

22. An apparatus of adapting a pilot filter that processes received signals in a wireless communication network, comprising:
means for determining a velocity of a wireless communication device in relation to a wireless network infrastructure;
means for estimating a noise power estimate of at least one of the received signals; and
means for determining one or more coefficients of the pilot filter based on the determined velocity of the wireless communication device and the noise power estimate,
wherein:
the pilot filter receives a plurality of pilot symbols; and
each symbol of the plurality is multiplied by the at least one of the one or more coefficients.

23. An apparatus as defined in claim 22, wherein the means for determining the velocity of the wireless communication device and the means for determining the one or more coefficients are in the wireless communication device.

24. An apparatus as defined in claim 22, further comprising means for applying the one or more coefficients to a pilot filter.

25. An apparatus as defined in claim 22, wherein the means for determining the velocity further comprises means for receiving velocity information from a global positioning system receiver.

26. An apparatus as defined in claim 22, wherein the means for determining the velocity further comprises means for receiving at least two location measurements of the wireless communication device, wherein the measurements are made at different, known, times, and determining the velocity of the wireless communication device is based on the at least two location measurements and their respective measurement times.

27. An apparatus as defined in claim 22, wherein the means for determining the one or more coefficients further includes means for selecting the one or more coefficients from a set of predetermined coefficients.

28. An apparatus as defined in claim 22, wherein the one or more coefficients vary with an increase in the determined velocity, and the one or more coefficients vary with a decrease in the determined velocity.

29. An apparatus as defined in claim 22, wherein the coefficients are selected to adapt the pilot filter to a communication channel having an optimal performance.

30. An apparatus as defined in claim 22, further comprising:
   means for adapting the pilot filter to a communication channel having an optimal performance.

31. A computer-readable medium comprising instructions for adapting a pilot filter that processes received signals in a wireless communication network, comprising:
   determining a velocity of a wireless communication device in relation to a wireless network infrastructure;
   estimating a noise power estimate of at least one of the received signals; and determining one or more coefficients of the pilot filter based on the determined velocity of the wireless communication device and the noise power estimate,
   wherein:
   the pilot filter receives a plurality of pilot symbols; and
   each symbol of the plurality is multiplied by the at least one of the one or more coefficients.

32. A computer-readable medium as defined in claim 31, further comprising applying the one or more coefficients to a pilot filter.

33. A computer-readable medium as defined in claim 31, wherein determining the velocity further comprises receiving velocity information from a global positioning system receiver.

34. A computer-readable medium as defined in claim 31, wherein determining the velocity further comprises receiving at least two location measurements of the wireless communication device, wherein the measurements are made at different, known, times, and determining the velocity of the wireless communication device is based on the at least two location measurements and their respective measurement times.

35. A computer-readable medium as defined in claim 31, wherein determining the one or more coefficients further includes selecting the one or more coefficients from a set of predetermined coefficients.

36. A computer-readable medium as defined in claim 31, wherein the one or more coefficients vary with an increase in the determined velocity, and the one or more coefficients vary with a decrease in the determined velocity.

37. A computer-readable medium as defined in claim 31, wherein the coefficients are selected to adapt the pilot filter to a communication channel having an optimal performance.

38. A computer-readable medium as defined in claim 31, further comprising:
   adapting the pilot filter to a communication channel having an optimal performance.

* * * * *